US007349000B2

(12) United States Patent
McDonald et al.

(10) Patent No.: US 7,349,000 B2
(45) Date of Patent: Mar. 25, 2008

(54) METHOD AND SYSTEM FOR DISPLAY OF VIDEO DEVICE STATUS INFORMATION

(75) Inventors: Brian McDonald, Austin, TX (US); James Lemieux, Austin, TX (US); Wendy McKibben, Austin, TX (US); James Stephens, Austin, TX (US)

(73) Assignee: Tandberg Telecom AS, Lysaker (NO)

( * ) Notice: Subject to any disclaimer, the term of this patent is extended or adjusted under 35 U.S.C. 154(b) by 885 days.

(21) Appl. No.: 10/425,522

(22) Filed: Apr. 28, 2003

(65) Prior Publication Data

US 2003/0202008 A1    Oct. 30, 2003

Related U.S. Application Data

(60) Provisional application No. 60/376,454, filed on Apr. 30, 2002.

(51) Int. Cl.
*G06F 3/00* (2006.01)
*G06F 15/177* (2006.01)
*G06F 3/048* (2006.01)

(52) U.S. Cl. ............... 345/719; 715/719; 715/749; 715/736; 715/772; 715/859

(58) Field of Classification Search .............. 709/204; 715/719, 749, 736, 772, 859, 751, 756; 345/719
See application file for complete search history.

(56) References Cited

U.S. PATENT DOCUMENTS

| 5,745,161 | A | * | 4/1998 | Ito ........................ 348/14.09 |
| 5,872,922 | A | * | 2/1999 | Hogan et al. .............. 709/204 |
| 5,872,923 | A | * | 2/1999 | Schwartz et al. .......... 709/205 |
| 6,192,118 | B1 | * | 2/2001 | Bayless et al. ........ 379/201.01 |
| 6,211,858 | B1 | * | 4/2001 | Moon et al. ................ 715/771 |
| 6,286,034 | B1 | * | 9/2001 | Sato et al. .................. 709/204 |
| 6,314,438 | B1 | * | 11/2001 | Stein et al. ................. 715/512 |
| 6,343,314 | B1 | * | 1/2002 | Ludwig et al. ............. 709/204 |
| 6,437,818 | B1 | * | 8/2002 | Ludwig et al. ......... 348/14.09 |
| 6,476,858 | B1 | * | 11/2002 | Ramirez Diaz et al. .... 348/159 |
| 6,496,209 | B2 | * | 12/2002 | Horii .......................... 715/853 |
| 6,559,863 | B1 | * | 5/2003 | Megiddo .................... 715/753 |
| 6,665,006 | B1 | * | 12/2003 | Taguchi .................. 348/211.1 |

(Continued)

*Primary Examiner*—Weilun Lo
*Assistant Examiner*—David Phantana-angkool
(74) *Attorney, Agent, or Firm*—Oblon, Spivak, McClelland, Maier & Neustadt, P.C.

(57) ABSTRACT

The status of a video call is displayed in a simplified and intuitive graphical user interface that presents status information of individual video devices of the video call with graphical or color indications with a gauge metaphor, such as a vertically or horizontally aligned bar of icons. Each video device of the video call is represented by an icon having a display position or color so that the icons are arranged to depict video devices together that have similar states. For instance, a video call is represented by a bar of icons ordered by the status of each video device with icons having the same color located contiguous with each other so that a video call with an overall good status appears as a green bar and a video call with an overall poor status appears as a red bar with red icons indicating failed video devices. A summary icon summarizes the overall state of a video call by indicating the color or graphical information of the video device of the video call that has the problem of greatest concern.

14 Claims, 3 Drawing Sheets

U.S. PATENT DOCUMENTS

| | | | |
|---|---|---|---|
| 6,948,131 B1* | 9/2005 | Neven et al. | 715/753 |
| 6,966,035 B1* | 11/2005 | Suess et al. | 715/753 |
| 7,124,368 B1* | 10/2006 | Subramanian et al. | 715/736 |
| 7,136,475 B1* | 11/2006 | Rogers et al. | 379/213.01 |
| 7,165,152 B2* | 1/2007 | Blumenau et al. | 711/152 |
| 2002/0120687 A1* | 8/2002 | Diacakis et al. | 709/204 |
| 2004/0003040 A1* | 1/2004 | Beavers et al. | 709/204 |
| 2006/0192848 A1* | 8/2006 | Ni | 348/14.08 |
| 2006/0256188 A1* | 11/2006 | Mock et al. | 348/14.09 |

\* cited by examiner

METHOD AND SYSTEM FOR DISPLAY OF VIDEO DEVICE STATUS INFORMATION

RELATED APPLICATIONS

This application relates to application Ser. No. 60/376,454 filed on Apr. 30, 2002 entitled "Video Conferencing System" and naming Kevin Bowman, Nainesh Desai, James Lemieux, Brian McDonald, Kurtis Seebaldt, Jayanta Tewari, as inventors, the application being incorporated herein by reference in its entirety.

BACKGROUND OF THE INVENTION

1. Field of the Invention

The present invention relates in general to the field of video conferencing, and more particularly to a method and system for display of status information for video devices in video conferences.

2. Description of the Related Art

Over the past several years, video conferencing has gained acceptance as a way for businesses to conduct meetings. Compared with audio telephone conferences, video conferencing allows a more personal interaction between participants and supports visual presentation of information, such as by sharing presentations and documents. The quality of communication by video conferencing has steadily improved in recent years with the availability of greater communication bandwidth and information processing capability. This improved quality has encouraged businesses to invest in video communication devices and networks to support greater numbers of video conferences, both within the business and with customers outside of the business. One advantage for a business in investing in video conferencing capability is a reduction in travel costs with greater numbers of meetings occurring via video conferencing instead of in person. However, as the number of video calls and the complexity of video networks for a business increase, difficulties in use, scheduling and interoperability of video devices often arise. One key for a business to obtain the most possible return on an investment in video devices and a video network is simplification of the use of the video devices and video network so that users will feel comfortable relying on the video devices and video network for important communications.

As an example of the complexity that sometimes arises in the use of video devices on a video network, a business video network may have multiple active and scheduled video calls that each uses a variety of different types of video devices manufactured by different manufacturers and compliant with a variety of standards. For instance, each of the multiple video calls supported on a video network at a given time may communicate audiovisual and data information between multiple video end points located on different networks using H.320 and H.323 standards through gateways, switches, routers and multi-point call units (MCUs). Further adding to the complexity of monitoring and scheduling video calls is the convergence towards Internet-based video communication that performs video device functions with software modules deployed on server devices. Although video devices manufactured by different manufacturers generally are able to support video calls by the use of standard communication protocols, each manufacturer typically has unique interfaces for determining the status of their own video devices.

A video network administrator responsible for scheduling video calls and monitoring the progress of active video calls typically has to have familiarity with multiple interfaces and experience in network administration to interact effectively with different manufacturer interfaces for monitoring multiple active calls. With multiple active video calls, a variety of video devices may connect and disconnect to an active video conference or experience technical difficulties, such as excessive data latencies, that may call for network administrator intervention. In order for the network administrator to track video call progress and status or to intervene to correct video call difficulties or video device failures, the network administrator generally must navigate through a variety of user interfaces to review video device states and events. Typically, navigating through various interfaces is difficult and time consuming, requiring interpretation of textual data or non-intuitive graphical presentations such as call logs or separate device representations, so that even experienced network administrators are easily overwhelmed with the task of monitoring video calls and are thus capable of only limited corrective actions during peak operations to ensure smooth video network operations.

SUMMARY OF THE INVENTION

Therefore a need has arisen for a method and system which simplifies summary presentation of video device information for video calls while supporting access to detailed video device information to identify video device difficulties.

In accordance with the present invention, a method and system are provided which substantially reduce or eliminate the problems and difficulties associated with previous methods and systems for presenting video device information. Video device status information for video devices of one or more video calls is displayed as a graphical representation that visually indicates the overall state of a video call.

More specifically, a video network platform interfaces with video devices to retrieve status information of the video devices, such as a failed, warning, changing or normal operational state, or events. A video call monitor engine interfaced with the video network-platform analyzes the status information of the video devices to associate each video device with one or more active or scheduled video calls and a display position in the graphical representation. A graphical user interface in communication with the video call monitor engine displays each video call as a bar formed by plural icons with each icon representing a video device of the video call. The icons are aligned by display position so that video devices having similar states are displayed as contiguous sets across a horizontal or vertical bar. Different video device states are represented by different colors, such as red for failed states and green for normal states, so that the relative size of a colored portion of a video call bar visually indicates the relative health of the video call. Activation of an icon expands a separate window to display detailed information regarding the video device associated with the icon. In one embodiment, a summary icon displays the overall health of a video call with a graphical or color display of the video device having the greatest difficulty in the video call.

The present invention provides a number of important technical advantages. One example of an important technical advantage is that a video network administrator is presented with an intuitive view of video device information for monitoring the status and progress of multiple video calls. The video administrator is presented with a simple call status summary representation that communicates the status of video calls and provides detailed video device details by drilling down through representations of specific video devices. Icon geometry and color representations of video call and video device states communicate the types and amounts of problems and events to provide intuitive video network monitoring that enables a video network administrator to more effectively identify and handle video call management tasks. Thus, a video network administrator is able to monitor multiple video calls with each having multiple video devices through a simplified interface in a less time-consuming manner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Video device status information is displayed in a simplified and intuitive format to allow a video network administrator to quickly and accurately evaluate the overall status of active or scheduled video calls. Color and/or graphics in a graphical user interface simulate conventional representations of either capacity, such as a fuel gauge, or strength, such as a cell phone signal strength indicator, to visually indicate the overall status of a video call. For instance, individual video devices of a video call are represented by icons that indicate the status of a video device with a color, such as the color red to indicate a failure or green to indicate normal operations, and organized by status to display colors as contiguous groups. A video network administrator is provided with a visual indication of the relative health of a video call by viewing the relative size of the groups of colored icons. For example, a quick glance at a video call represented by icons displayed as a bar indicates that the video call status is healthy if the bar is all or substantially all green, however, a group of yellow or red icons along the bar indicates that the video call has a problem occurring. The network administrator may then activate an icon to drill down to more detailed status information, such as detailed state or event information specific to a selected video device.

Figure 1:
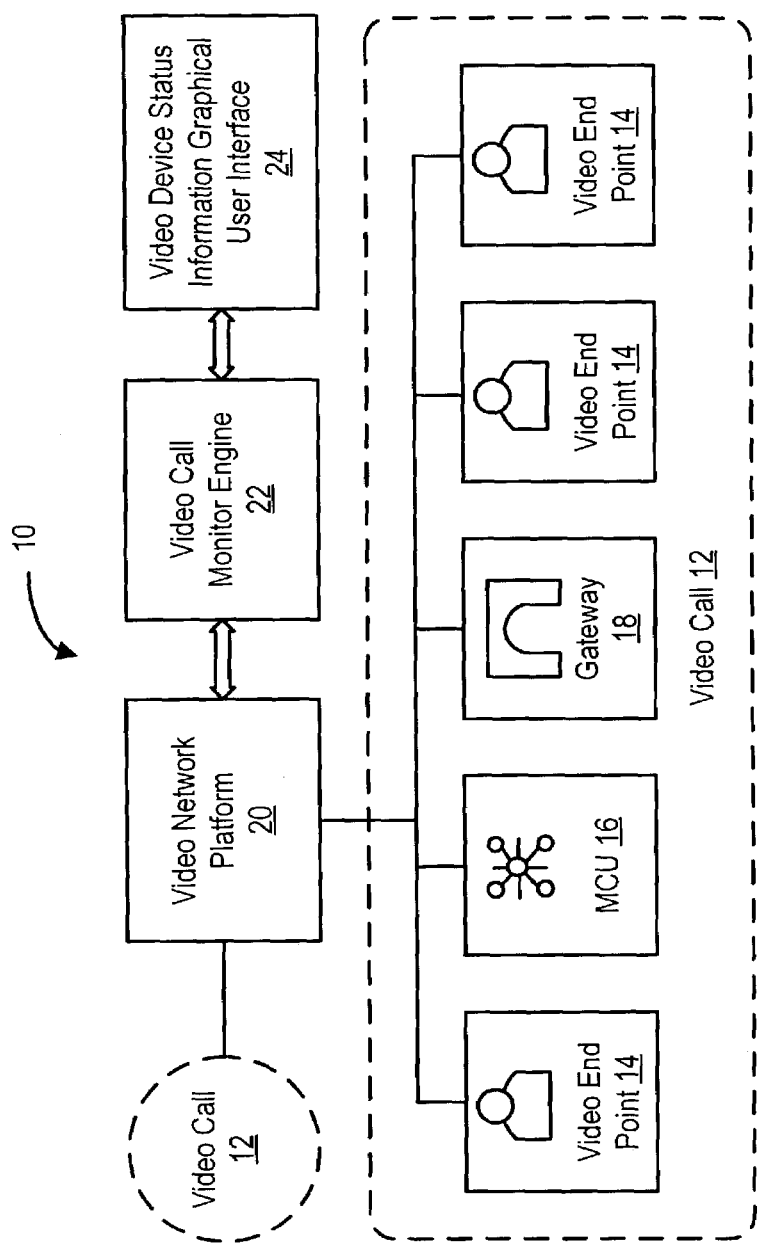
FIG. 1 depicts a block diagram of a system for display of video device status information.

Referring now to FIG. 1, a block diagram depicts a system 10 for display of video device status information for plural video devices involved in plural video calls 12. An example of a video call using video endpoints 14, an MCU 16 and a gateway 18 is depicted with monitoring of video call 12 provided by a video network platform 20. Video endpoints 14 capture and display audiovisual information for participants to video call 12 and communicate the audiovisual information to other video endpoints through a network, such as with H.320 or H.323 standard communication protocols. MCU 16 coordinates communication of audiovisual information for video calls involving three or more endpoints 14, and gateway 18 converts audiovisual information between H.320 and H.323 protocols to support communication between endpoints 14 using different protocols. Video network platform 20 communicates with the video devices to gather status information, such as state and event information. For instance, video network platform 20 monitors connection state of video devices, including detailed state information such as jitter and latency, and tracks events such as dialing of connections and disconnects. Video network platform 20 communicates with individual video devices with each video device's manufacturer protocol and organizes the video device status information in a universal format for use by external devices.

A video call monitor engine 22 interfaces with video network platform 20 to obtain the video call information and to organize the video call information for display on a video device status information graphical user interface 24. Video call monitor engine 22 organizes video devices by video call and associates each video device with a display position based upon the status information of the video device. Video call monitor engine 22 periodically updates the status information of video devices and applies the updated status information to determine changes to a video call configuration or a video device display position to ensure that video device status information graphical user interface 24 displays up to date status information for active and scheduled video calls and for individual video devices. For instance, if a video device unexpectedly disconnects or experiences other types of failures, the status of the video device is updated to a "failed" state. If a video device operates in a non-nominal state, such as with poor latency or jitter statistics, the status of the video device is updated to a "warning" state. If a video device is performing an event that leads to a change in state for the video device, such as dialing, the status of the video device is updated to a "changing" state. If a video device operates in a normal or nominal state, the status of the video device is updated to a "normal" state.

Video device status information graphical user interface 24 displays video device status information organized by video call and the display position provided by video call monitor engine 22 to timely convey the overall status of video calls with a visually intuitive display. For instance, video calls are depicted as bars of vertically or horizontally aligned icons ordered by display position so that icons of video devices having the same state are contiguously laid out in the bar. Each icon may include a graphical representation of the type of device, such as an image of a person for video endpoints, a connection point image for MCUs and a gate for gateway video devices. Each icon may also have a color representative of the state of the video device associated with the icon, such as red for a failed state, yellow for a warning state, blue for a changing state or green for a normal state. The colors of a video call are displayed contiguously, i.e., grouped by color, in a video call bar so that a video network administrator may quickly view the relative size of each color in the bar to determine the overall state of a video call. This visual presentation follows a gauge metaphor with groups of icons organized from icons indicating the greatest to the least problems. For instance, a green or mostly green bar indicates that a video call is proceeding normally while a significant red portion in a bar indicates that the video call is experiencing trouble, with a longer line of red icons indicating more problems with a video call. In alternative embodiments, video device status information graphical user interface 24 uses analog dials to communicate video call information, such as an analog dial similar to a tachometer or thermometry gauge. A video network administrator is thus able to more quickly hone in on problem areas for a video call by activating the display proximate to the problem, e.g., red, area to obtain more detailed video device status information. In one alternative embodiment, audio or other communication devices are monitored along with video devices or as a separate user interface. For instance, audio-only telephone conference calls may be presented as a bar of audio icons or an audio-only participant to a video conference may be presented with a telephone icon in the bar along with the video icons. Further, additional conference resources, such as room scheduling or participant availability may also be tracked with a graphical presentation such as a bar that provides a visual indication of difficulties.

Figure 2:
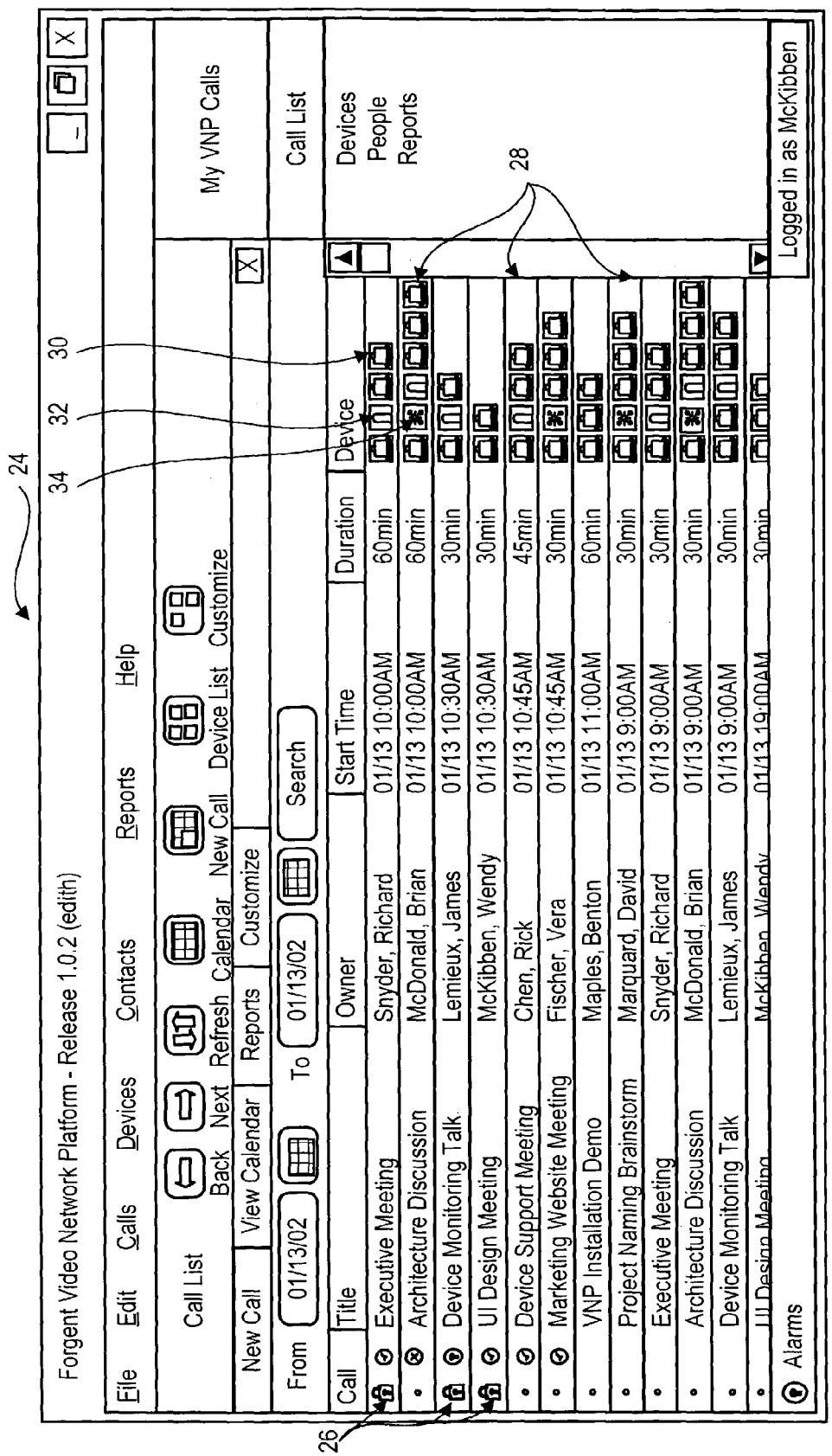
FIG. 2 depicts a graphical user interface for display of video device status information.

Referring now to FIG. 2, one embodiment of video device status information graphical user interface 24 for displaying video device status information is depicted. Each schedule row 26 of graphical user interface 24 represents a scheduled or active video call 12 including scheduling information aligned in columns, such as the title, owner, start time and duration of each video call 12. At the end of each schedule row 26 is a video device bar 28 that includes an icon for each video device associated with the video call 12 of each schedule row 26. Each icon includes a graphical representation of the type of video device represented by the icon, such as a video endpoint icon 30, a gateway icon 32, and a MCU icon 34. The icons of a video device bar 26 are ordered by the display position provided by video call monitor engine 22. For instance, red icons are presented to the far left of video device bar 26, followed to the right by yellow, blue and green icons respectively. The order of the video calls displayed as schedule rows 26 may be sorted to display video calls 12 having the greatest number of problems, such as is indicated by the number of red or yellow icons, at the top of graphical user interface 24 before video calls 12 having lesser numbers of problems. A video network administrator may quickly drill down through specific video devices by pointing to and activating a selected icon to display a separate window with detailed video call status information for the video device associated with the icon.

Figure 3:
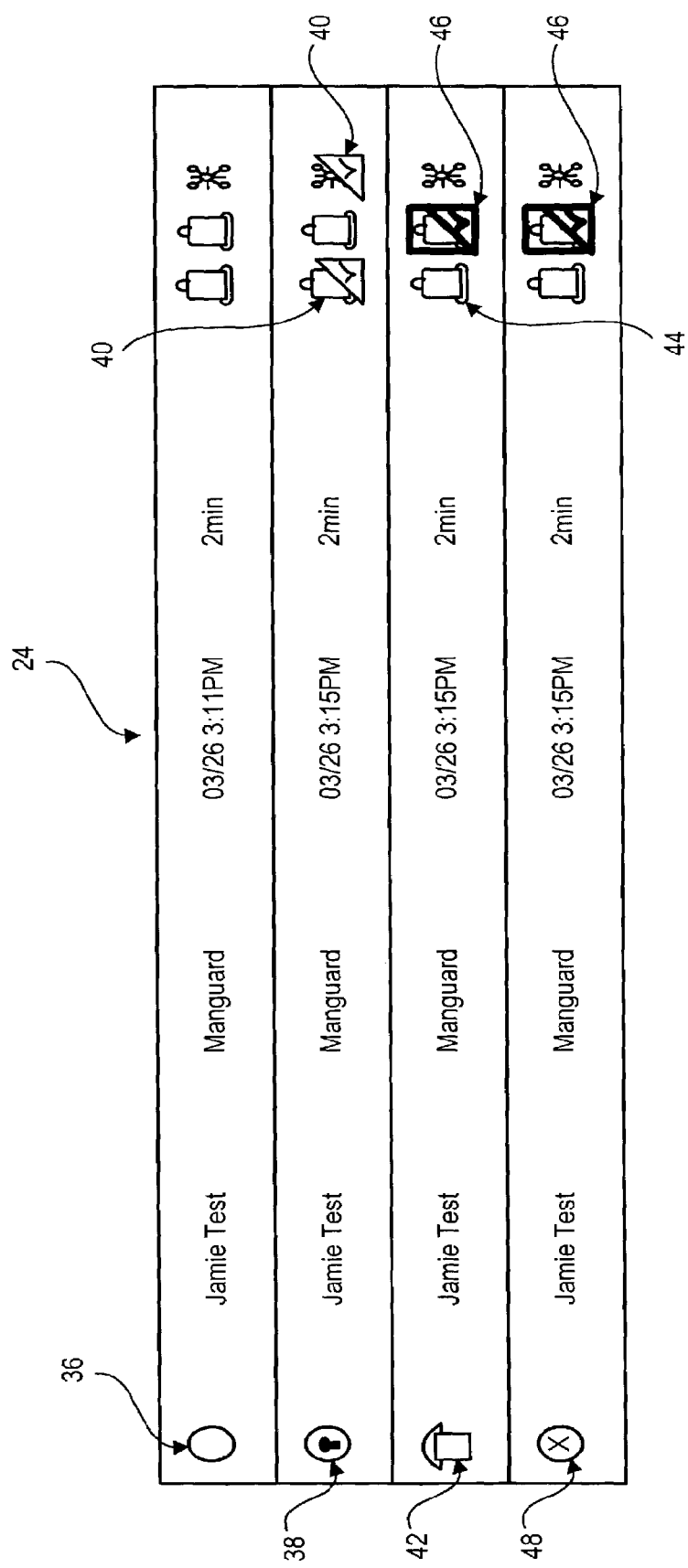
FIG. 3 depicts a graphical user interface for display of a summary of video device status information for video devices of a video call.

Referring now to FIG. 3, another embodiment of video device status information graphical user interface 24 for displaying video device status information is depicted with a summary icon for displaying a visual summary of the overall status of a video call. A video call having all video devices with normal state status is summarized with green normal summary indicator 36, and the bar of icons are each displayed with a green color. A video call having a video device with a warning state status is summarized with a yellow warning summary indicator 36, and the bar of icons includes a graphical and colored indication of a warning status, such as a yellow or blue foreground having a check mark to indicate the video devices having problems. A video call having a video device with a changing state, such as a video device performing dialing, is summarized with a changing summary indicator 42, and the bar of icons includes a graphical and colored indication of the changing status, such as a blue foreground with a graphical telephone depiction shown with icon 44. A video call having a video device with a failed state is summarized with a red failed summary indicator 48, and the bar of icons includes a graphical and colored indication of a failed status, such as red-boxed icons 46 to indicate the video device having a failed status. The summary indicator assumes the color associated with the existing state that indicates the worst video device problem. For instance, changing state indicator 42 depicts that the video device associated with icon 44 is calling but assumes a red color due to the failed state of the video device associated with icon 46. A video administrator may select an icon to drill down for greater status information, such as the call progress of a video device in a changing state and the event or specific state information related to a video device in a warning or failed state.

Although the present invention has been described in detail, it should be understood that various changes, substitutions and alterations can be made hereto without departing from the spirit and scope of the invention as defined by the appended claims.

What is claimed is:

1. A system for display of video teleconference device status information for plural video teleconference devices, each video teleconference device associated with one or more of plural video teleconference calls, the system comprising:

a video teleconference network platform operable to interface with the video teleconference devices to retrieve status information of the video teleconference devices;

a video teleconference call monitor engine interfaced with the video teleconference network platform and operable to analyze the status information to associate each video teleconference device with a video teleconference call and a display position;

a graphical user interface in communication with the video teleconference call monitor engine and operable to display plural bars, each bar representing a video teleconference call; and plural icons disposed in each bar, each icon representing a corresponding video teleconference device of the video teleconference call, each of said plural icons including a graphical representation uniquely corresponding to a type of video device represented, the types of video teleconference devices comprising a video teleconference end point device, a multipoint call unit device or a gateway device, wherein each video teleconference device has a diagnostic state and each icon represents the diagnostic state of its associated video teleconference device by one of plural colors, with icons of devices involved in the video teleconference call displayed contiguously by color to aid in visualization of an overall diagnostic state of the video teleconference call, and an icon of a calling video device corresponding to the type of the calling video device, but assuming a status indication corresponding to a called device.

2. The system of claim 1 wherein the status information comprises video teleconference device state information and the display position comprises a ranking of relative importance of the state information for the video teleconference device compared with other video teleconference devices of the video teleconference call.

3. The system of claim 2 wherein the icons are aligned as a horizontal bar.

4. The system of claim 2 wherein the icons are aligned as a vertical bar.

5. The system of claim 1 wherein the video teleconference call monitor engine associates video teleconference devices having a failed state with the color red and a predetermined display position, and wherein the graphical user interface displays a red icon bar to illustrate a severity of video teleconference device failures for a video teleconference call.

6. The system of claim 1 wherein the colors comprise red for video teleconference devices having a failed state and green for video teleconference devices having a normal state, the graphical user interface providing a visual depiction of a state of each video teleconference call by comparing a length of ordered red icons with length of ordered green icons for each video teleconference call.

7. The system of claim 1 wherein the status information comprises state and event information and wherein the graphical user interface is further operable to detect activation of an icon by an input device and to display desired state and event information of a video teleconference device upon activation of the icon associated with the video teleconference device.

8. The system of claim 1 wherein the graphical user interface further comprises a summary icon for each video teleconference call, the summary icon depicting a color associated with a lowest state of a video teleconference device associated with the video teleconference call.

9. A method for display of video teleconference device status information for plural video teleconference devices, each video teleconference device associated with one or more of plural video teleconference calls, the method comprising:
    gathering status information for the video devices;
    associating each video teleconference device with a video teleconference call;
    ordering the video teleconference devices associated with each video teleconference call according to a status of each video teleconference device in the video teleconference call;
    representing each video device as an icon;
    displaying plural bars, each bar representing a video teleconference call; and
    displaying plural icons disposed in each bar, each icon representing a corresponding video teleconference device of the video teleconference call, each of said plural icons including a graphical representation uniquely corresponding to a type of video device represented, the types of video teleconference devices comprising a video teleconference end point device, a multi-point call unit device or a gateway device, wherein
    each video teleconference device has a diagnostic state and each icon represents the diagnostic state of its associated video teleconference device by one of plural colors, with icons of devices involved in the video teleconference call displayed contiguously by color to aid in visualization of an overall diagnostic state of the video teleconference call, and
    an icon of a calling video device corresponding to the type of the calling video device, but assuming a status indication corresponding to a called device.

10. The method of claim 9 wherein displaying a representation of each video teleconference call as a bar of icons further comprises displaying a horizontal bar of icons for each video teleconference call.

11. The method of claim 9 wherein displaying a representation of each video teleconference call as a bar of icons further comprises displaying a vertical bar of icons for each video teleconference call.

12. A graphical user interface comprising:
    plural bars, each bar representing a video teleconference call; and
    plural icons disposed in each bar, each icon representing a corresponding video teleconference device of the video teleconference call; each of said plural icons including a graphical representation uniquely corresponding to a type of video device represented, the types of video teleconference devices comprising a video teleconference end point device, a multi-point call unit device or a gateway, wherein
    each video teleconference device has a diagnostic state and each icon represents the diagnostic state of its associated video teleconference device by one of plural colors, with icons of devices involved in the video teleconference call displayed contiguously by color to aid in visualization of an overall diagnostic state of the video teleconference call,
    an icon of a calling video device corresponding to the type of the calling video device, but assuming a status indication corresponding to a called device, and
    a display for displaying said bars and icons.

13. The graphical user interface of claim 12 wherein video teleconference devices having a normal state are represented by green icons and video teleconference devices having an abnormal state are represented by red icons.

14. A method of displaying video teleconference device status information for plural video teleconference devices associated with one or more video teleconference calls, the method comprising:
    determining a capacity status of the video teleconference devices of the video teleconference call;
    displaying the capacity status of the video teleconference devices by simulating a fuel quantity gauge;
    displaying a calling video device with an icon corresponding to a type of the calling video device, but assuming a status indication corresponding to a called device; and
    displaying a graphical representation corresponding uniquely to a type of video device represented by the icon, the types of video teleconference devices comprising a video teleconference end point device, a multi-point call unit device or a gateway device.

* * * * *